United States Patent [19]

Castonguay

[11] Patent Number: 5,120,478
[45] Date of Patent: Jun. 9, 1992

[54] CEMENT FOR COLLECTOR BAR-CARBON BLOCK JOINTS OF ELECTROLYTIC CELLS

[75] Inventor: Lise Castonguay, Jonquiere, Canada

[73] Assignee: Alcan International Limited, Montreal, Canada

[21] Appl. No.: 659,870

[22] Filed: Feb. 22, 1991

Related U.S. Application Data

[62] Division of Ser. No. 401,106, Aug. 31, 1989, abandoned.

[30] Foreign Application Priority Data

Sep. 6, 1988 [CA] Canada ................................. 576558

[51] Int. Cl.[5] ...................... C01B 31/00; H01B 1/06; C08K 3/04; C25C 7/04
[52] U.S. Cl. .................................. 264/29.5; 204/294; 252/511; 264/29.1, 279.1; 524/495; 524/496
[58] Field of Search ............... 252/511; 524/495, 496; 204/294; 264/29.5, 29.1, 279.1

[56] References Cited

U.S. PATENT DOCUMENTS

| 3,334,040 | 8/1967 | Conrad et al. | 204/294 |
|---|---|---|---|
| 3,421,991 | 1/1969 | Hildebrandt | 264/29.1 |
| 3,468,737 | 9/1969 | Hildebrandt | 204/290 R |
| 3,853,793 | 12/1974 | Brown et al. | 252/510 |
| 3,856,574 | 12/1974 | Amagi et al. | 204/294 |
| 3,871,986 | 3/1975 | Reamey et al. | 204/294 |
| 3,969,124 | 7/1976 | Stewart | 264/29.5 |
| 4,001,104 | 1/1977 | Vadla et al. | 204/243 R |
| 4,167,419 | 9/1979 | Dell | 106/284 |
| 4,192,730 | 3/1980 | Dumas et al. | 204/294 |
| 4,264,371 | 4/1981 | Dell | 106/284 |
| 4,282,039 | 8/1981 | Bollough | 106/278 |
| 4,288,353 | 9/1981 | Eckel et al. | 523/450 |
| 4,479,913 | 10/1984 | Akerberg et al. | 264/29.5 |
| 4,816,511 | 4/1989 | Castonguay | 252/511 |
| 4,897,170 | 1/1990 | Chadramouli | 252/511 |
| 4,915,874 | 4/1990 | Nadkarni et al. | 252/511 |

FOREIGN PATENT DOCUMENTS

| 838715 | 4/1970 | Canada . |
| 0075279 | 8/1984 | European Pat. Off. . |
| 2251629 | 7/1975 | France . |
| 098378 | 6/1983 | Japan . |
| 1466053 | 3/1977 | United Kingdom . |
| 1268997 | 3/1979 | United Kingdom . |
| 2106494 | 4/1983 | United Kingdom . |

Primary Examiner—William R. Dixon, Jr.
Assistant Examiner—Helene Klemanski
Attorney, Agent, or Firm—Cooper & Dunham

[57] ABSTRACT

A cement for cathode collector bar/carbon block joints of electrolytic reduction cells as used, for example, for the production of aluminum. The cement comprises an aggregate of anthracite, graphite or mixtures of the two, and a binder comprising a curable water-soluble liquid polymeric resin and water. The fluidity of the cement is high enough that a joint may be formed by pouring the cement into a slot in the carbon block and positioning a bar on the top of the cement. The weight of the bar forces the cement up around the sides of the bar. The fluidity of the cement is made high enough by the use of an aggregate of −200 Tyler mesh, a resin content of 34-37% by weight of the cement and an amount of water in the range of 7-13% by weight of the cement. While the cement fluidity is suitably high as indicated above, it has a linear shrinkage of 4-5% when subjected to high temperature. These characteristics enable the cement to be used for the intended application without cracking the carbon blocks or permitting the formation of a gap between the bar and the block.

3 Claims, No Drawings

CEMENT FOR COLLECTOR BAR-CARBON BLOCK JOINTS OF ELECTROLYTIC CELLS

This is a division of application Ser. No. 401,106, filed Aug. 31, 1989, now abandoned.

BACKGROUND OF THE INVENTION

I. Field of the Invention

This invention relates to cements used for current collector bar-carbon block joints of electrolytic reduction cells using molten salt electrolytes, e.g. those used for the production of aluminum.

II. Description of the Prior Art

Aluminum is conventionally produced by the reduction of alumina in a "Hall-Heroult" electrolytic cell provided with a lining made of prebaked carbon blocks. The lining acts both as a refractory material to protect the cell walls and bottom from the hot molten electrolyte and aluminum, an as a cathode for the electrolysis process. Current is conveyed from the carbon lining by steel collector bars which extend into slots in the carbon blocks. The slots are made slightly larger than the collector bars to allow for ease of assembly, different rates of expansion of the steel and carbon and slight movements of the collector bars. However, the electrical connection between the carbon lining blocks and the steel collector bars must be good, so an electrically conductive material is generally used to fill the gaps between the bars and the carbon blocks.

When a conductive cement is used in bar-block joints it is traditionally a hot ramming mix consisting of a carbonaceous aggregate, such as calcined anthracite, and a binder, such as pitch or a tar-pitch mixture. The mix is tamped into the joint at a temperature of about 100° C. to 130° C. The use of pitch or tar-pitch mixtures as a binder causes environmental problems. During the filling of the joints, workers are exposed to tar fumes from the hot mix and to noise generated by tamping tools.

Attempts have been made to overcome these problems by providing room temperature cements (normally consisting of a carbonaceous aggregate and a polymeric binder or a low softening point carbonaceous binder) which are tamped or hand pressed into the bar-block joints. While the use of these cements reduces the exposure of workers to fumes, they still require a tamping or pressing step which is difficult and (when tamping tools are used) noisy. Both the problem of fume generation and the need for a tamping or pressing step could be avoided if a room temperature cement of high fluidity could be developed. The cement could then be poured into the bottom of a slot and the collector bar placed over the cement. The weight of the collector bar would then force the fluid cement up around the sides of the bar and thus entirely fill the bar block joint without the need for tamping or pressing. After suitable curing of the cement, the assemblies could then be inverted and the blocks installed in a cell with the slots on the undersides. However, such a cement would not only have to have the correct fluidity requirements, it would also have to perform adequately at cell operating temperatures, and the shrinkage of the cement when exposed to high temperature is of particular importance.

During carbonization, the mixture in the bar-block joint shrinks and the steel bar and carbon slot expand. Expansion of the steel bar is almost four times higher than that of the carbon slot. This is partly compensated for by the shrinkage of the cement in the joint, but if the cement shrinks by too little the block wings may crack, whereas if it shrinks by too much, a gap is formed betwen the bar and the block which results in poor electrical contact. It has been found that a cement having a linear shrinkage in the range of about 4 to 5% can avoid the problems indicated above if used in a gap of 3 to 6 mm between the block and the bar. However, it is not an easy matter to produce a cement having both high fluidity and a linear shrinkage such that it can be used in gaps of 3 to 6 mm. If the particle size of the aggregate is reduced and the binder content is increased to maintain high fluidity, this results in increased shrinkage.

An object of the invention, accordingly, is to provide a room temperature cement which is fluid enough to be used in the manner outlined above but which also has a suitably low linear shrinkage to permit use in bar-block joints of the type described.

SUMMARY OF THE INVENTION

According to one aspect of the invention, there is provided a carbonaceous cement which comprises:

an aggregate selected from the group consisting of calcined anthracite, graphite, and mixtures thereof, said aggregate having a particle size of smaller than 200 Tyler mesh; and a binder comprising a curable water-soluble liquid polymeric resin and water;

the amount of resin in the cement being in the range of 34 to 37% by weight of the cement, and the amount of water being in the range of 7 to 13% by weight of the cement.

According to another aspect there is provided a method of forming a collector bar-carbon block joint by cementing a collector bar in a carbon block having a slot wider than the bar, which comprises: positioning a carbonaceous cement in the slot; positioning said bar in the slot on top of the cement; allowing the bar to sink into the cement and thereby force the cement around the bar; curing the cement and then carbonizing the cement at high temperature.

The invention also relates to a kit of parts suitable for the formation of the cement of the invention.

DETAILED DESCRIPTION OF THE INVENTION

Because of the high fluidity of the cement of the present invention, use of a tamping tool is not necessary and the slot gap can be made smaller. However, the shrinkage of the cement allows the gap to be within the range of about 3-6 mm, which means that precision machining techniques do not have to be used during the slot formation.

Reference is made throughout this specification to "room" or "ambient" temperature. Both these terms mean the temperatures normally encountered in the locations where the cements are used prior to cell operation, e.g. 10°-35° C., more usually 15°-25° C. and optimally about 25° C.

By the term "water-soluble liquid polymeric resin" we mean any resin which is liquid at ambient temperature and which has a solubility in water at ambient temperature of at least about 1% by weight (i.e. at least about 1 g of resin will dissolve in 100 g of water). In the cement formulation of the invention, the ratio of resin to water may be such that not all of the resin dissolves. This is acceptable provided the undissolved portion of the resin is watermiscible, i.e. able to form a colloidal suspension with the water consisting of a discontinuous phase evenly dispersed in a continuous phase. The resin should also be capable of solidifying by cross-linking or further polymerization at room temperature or a higher temperature. Liquid resins which require the presence of a curing agent in order to bring about the solidification may be employed, in which case the binder should additionally preferably contain a catalytically-effective amount of a latent (elevated temperature) curing agent.

The cement of the invention has a suitably low linear shrinkage (generally falling within the range of 4–5%) when subjected to carbonization, while also exhibiting a suitable fluidity at room temperature. This is believed to be due to the fact that the presence of the water maintains the required high fluidity of the cement at room temperature while permitting the resin content to be kept low in order to reduce linear shrinkage. The water makes no contribution to the coking value of the binder and hence does not add to shrinkage of the cement during carbonization. Instead, the low boiling point and non-reactivity of the water means that it escapes from the cement before carbonization takes place, either by evaporation or by soaking into the porous cathode blocks, or both.

Tests have shown that certain low boiling organic solvents are not effective as replacements for the water in the cement formulations of the invention and it consequently appears that the water may not act merely as a viscosity-reducing agent for the cement in the manner stated above. Without wishing to be bound to any particular theory, the inventors believe that the water may be effective for the following reason. When certain prior art cements were cured, a "frothing" of the cement in the block joint was observed which substantially expanded and weakened the cement and produced a very porous product. These cements contained phenolic resins which release volatiles, primarily water vapour, as they polymerize and cross-link and it is believed that an accelerated release of the volatiles causes the frothing. The presence of water in the binder may serve to reduce the rate of release of the volatiles by two separate mechanisms. Firstly, the water replaces some of the resin and thus reduces the concentration of the resin and decelerates the curing process. Secondly, the presence of the water may shift the equilibrium of the curing reaction in the reverse direction and hence further decelerate the curing step. This latter mechanism would explain why water is effective whereas certain other solvents are not.

When the water content of the cement is greater than 13% by weight, the cement tends to form excessively high porosity when cured. On the other hand, when the water content is below 7% by weight, adequate fluidity and limitation of frothing of the cement during curing may not be obtained.

The content of resin in the cement should not fall below about 34% by weight otherwise there will be inadequate fluidity and binder for the aggregate. On the other hand, the amount should not exceed about 37% by weight, otherwise the shrinkage of the cement will be too high.

The liquid polymeric resin preferably has a high coking value, e.g. 35% by weight or more, and is one which is soluble in water at room temperature and is also curable at ambient or elevated temperature. Resole and novolak resins may be employed and liquid phenol-formaldehyde type resins having a low viscosity and high water-solubility at ambient temperature and a high carbon yield are preferred. Suitable resins can be obtained from the Borden Chemical Company and from the Bakelite Company. A curing agent may be used, if required, depending on the resin employed. Novolak resins always require the presence of a curing agent.

The viscosity of the binder (resin plus water) is preferably kept below 200 cps at 25° C.

The curing agent, if used, is preferably of the latent (i.e. elevated temperature) type and should be present in a catalytically-effective amount, normally up to 5% by weight of the weight of the binder. When phenol-formaldehyde is used as the resin, examples of the curing agent are phosphonic acid, toluene sulphonic acid and benzene-sulphonic acid.

The aggregate has a particle size distribution (granulometry) in which 100% of the particles have a size smaller than 200 Tyler mesh in order to impart high fluidity to the cement.

When anthracite is employed in the aggregate it is calcined prior to use, preferably at a temperature of 1600° C. 1800° C. The calcination, preferably carried out electrically, has the following effects:

a) it eliminates the volatiles contained in the green anthracite;

b) it reduces swelling due to sodium absorption; and c) it eliminates shrinkage of the anthracite when subjected to high temperatures.

The cement is preferably prepared as follows. The binder is first prepared by mixing the resin and the water (and the catalyst, if required). The binder is then mixed with the aggregate for at least 5 minutes at room temperature. When a catalyst is used, the catalyst may if desired first be dissolved in the water and the solution mixed with the aggregate before the addition of the resin.

The required amount of cement is poured into the carbon slot and the bar is then positioned in the slot. The cement fills the gaps between the block and the bar under the action of the bar weight. If necessary filling of the gap can be completed by adding further cement with a trowel. The joint is then allowed to stabilize at room temperature for 24 to 48 hours. During this period water is absorbed by the block, avoiding excessive frothing and pore formation during subsequent curing.

After room temperature stabilization, the cement must usually be heated to a temperature of at least 100° C. for 15 minutes or more to cure the joint for further handling of the assembly. This can be achieved, for example, by heating the steel collector bar with a propane torch. Such a temperature is generally obtained in the joint when the average collector bar temperature (average between top and bottom temperatures) is between 160° and 190° C. After cooling the cathode block-collector bar assembly can be handled.

The cement undergoes carbonization during start-up of the cell but by that time the water has substantially dispersed by evaporation and/or absorption by the cathode blocks (substantial amounts of water were also evaporated during the previous curing process).

The cements of the invention may be sold in premixed form, but it is more likely that the various ingredients will be packaged separately for mixture by the customer immediately prior to use. Moreover, since water is likely to be readily available at the point of use of the cement, the product may be sold in the form of a "kit" containing all the ingredients except for water, together with instructions regarding how much water to add and how to mix the ingredients. Such a kit could contain the following ingredients in separate packages or compartments:
a. the graphite/anthracite aggregate
b. the liquid resin (excluding water)
c. optionally the curing agent
d. optionally water.

The relative proportions of these ingredients would be those required by the invention, and a further optional element of the kit would be a mixer (e.g. a common paste mixer) to enable the cement to be produced in a convenient manner by the purchasor.

Presently preferred embodiments of the invention are illustrated by the following Examples. In the Examples, percentages are by weight unless otherwise stated. The phenol-formaldehyde resin used in the Examples was a water-soluble product sold under the trade mark RL-2360 by the Borden Company which had viscosities of 100–200 cps at 25° C., and a coking value of 35–40%.

EXAMPLE

Different formulations were tested using a bar-block assembly formed from a piece of cathode block (255×255×130 mm) and a collector bar piece (65×115×130 mm). The cathode block had a slot dimensioned to leave a gap of 5 mm on both sides of the bar. The joint was made by partially filing the slot with cement and allowing the bar to settle into the slot. After curing of the joint, the adhesion of the bar to the block was measured by pushing the bar out of the block and recording the force of separation. The formulations and results are shown in Table 1 below.

collector bar in a carbon block having a slot wider than the bar to the extent that gaps between sides of the collector bar and adjacent sides of the slot have widths in the range of 3–6 mm, which method comprises:

pouring a carbonaceous cement in the slot, said cement comprising:
an aggregate selected from the group consisting of calcined anthracite, graphite and mixtures thereof, said aggregate having a particle size smaller than 200 Tyler mesh; and
a binder comprising a curable water-soluble liquid polymeric resin and water;

the amount of resin in the cement being in the range of 34 to 37% by weight of the cement, and the amount of water being in the range of 7 to 13% by weight of the cement;

positioning said bar in the slot on top of the cement;
allowing the bar to sink into the cement and thereby force the cement around the bar;
allowing the cement in the slot to stabilize at ambient temperature for 24 to 48 hours;
curing the cement by heating the cement to a temperature of at least 100° C. for at least 15 minutes and then carbonizing the cement at a carbonizing temperature up to a normal operational temperature of said electrolytic reduction cell.

2. A method according to claim 1 wherein the cement is heated by directing a flame against an exposed part of the collector bar until the average collector bar temperature is in the range of 160°–190° C.

3. A method according to claim 1 wherein said cement has a linear shrinkage in the range of 4–5% when

TABLE 1

| | DESCRIPTION OF THE LABORATORY TRIALS | | | | | |
|---|---|---|---|---|---|---|
| | Cement Composition | | Procedure | | Force of Separation | |
| Trial No. | Resin Content wt % | Water Content wt % | Room Temp. Curing (h) | Torch heating (min.) | of the Bar at Room Temp. (kg) | Visual Observations |
| A | 34 | 13 | 24 | 60 | 3550 | Good joint with low porosity |
| B | 34 | 13 | 48 | 15 | 1414 | Good joint with low porosity |
| C | 35 | 10.3 | 24 | 20 | 2043 | Good joint |
| D | 36.2 | 7 | 24 | 15 | 2336 | Very good joint |

What we claim is:

1. A method of forming a collector bar-carbon block joint of an electrolytic reduction cell by cementing a undergoing said carbonizing at high temperature and has a viscosity of less than 200 cps at 25° C.

* * * * *